Oct. 6, 1925.
A. T. RICARD
1,556,547
MOTOR OPERATED HANDSAW
Original Filed June 14, 1923
FIG. 1.
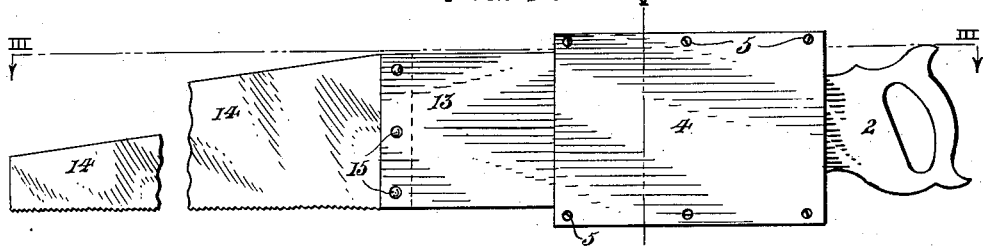
FIG. 2.
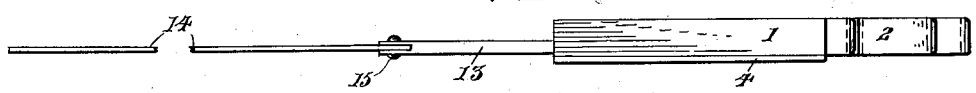
FIG. 3.
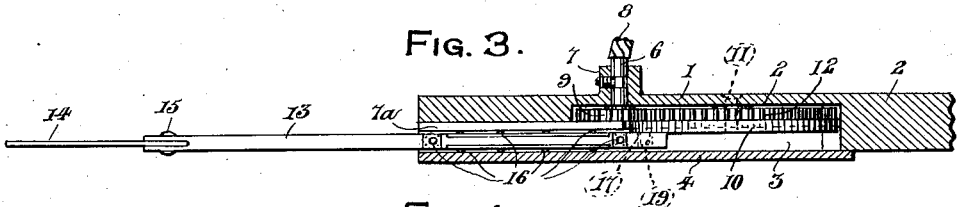
FIG. 4.
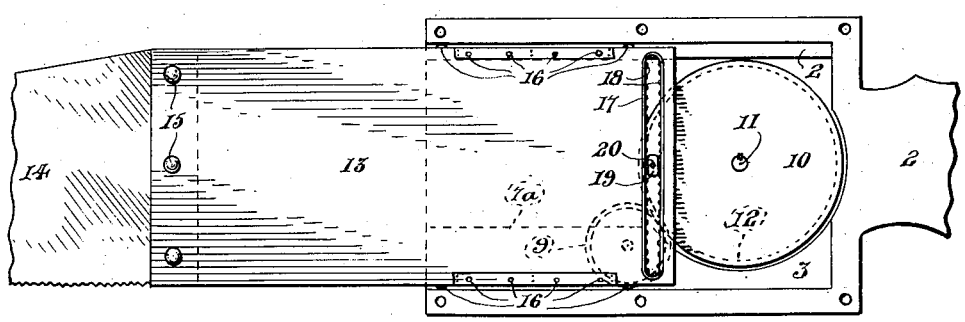
FIG. 5.    FIG. 6.
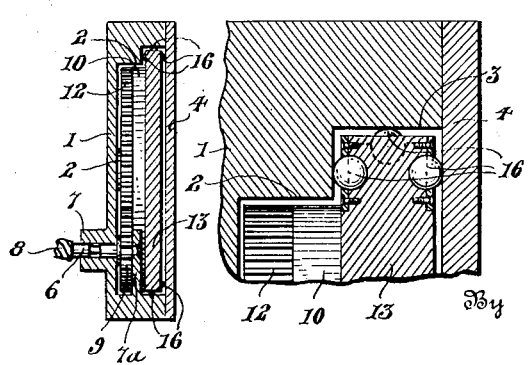
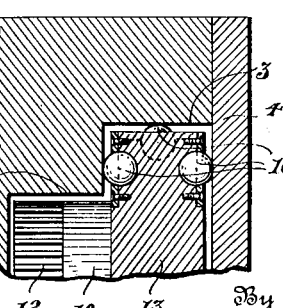
FIG. 7.
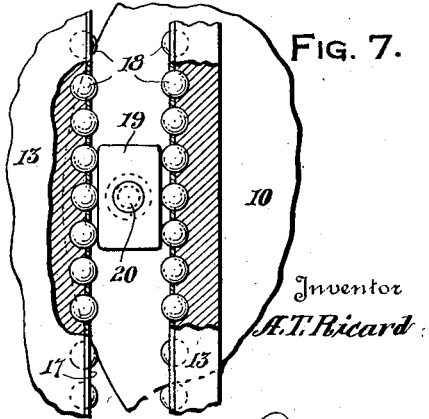
Inventor
A. T. Ricard
By F. W. Bryant
Attorney.

Patented Oct. 6, 1925.

1,556,547

UNITED STATES PATENT OFFICE.

ALPHONSE T. RICARD, OF DETROIT, MICHIGAN, ASSIGNOR OF NINE-TWENTIETHS TO FRANK FRUSTAGLIO, OF WINDSOR, CANADA.

MOTOR-OPERATED HANDSAW.

Application filed June 14, 1923, Serial No. 645,406. Renewed August 20, 1925.

*To all whom it may concern:*

Be it known that I, ALPHONSE T. RICARD, a citizen of Canada, residing at Detroit, in the county of Wayne and State of Michigan, have invented certain new and useful Improvements in Motor-Operated Handsaws, of which the following is a specification.

This invention relates to certain new and useful improvements in motor operated hand saws wherein the saw blade is adapted to be reciprocated while a supporting frame structure therefor is rigidly held against movement during operation.

The primary object of the invention is to provide a motor operated hand saw wherein a train of gearing operated by a flexible cable extending to a suitable source of power is adapted to effect rotation of a disk that has a pin and slot connection with a reciprocating plate that carries a saw blade.

Another object of the invention is to provide in a motor operated hand saw of the type above set forth, a novel type of anti-friction bearing between the disk 10 and slot walls of the saw carrying plate.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view, partly broken away, of a motor operated hand saw constructed in accordance with the present invention, Figure 2 is a top plan view of the same, Figure 3 is a longitudinal sectional view taken on line III—III of Fig. 1 showing the motor operated mechanism for reciprocating the saw blade, Figure 4 is a fragmentary side elevational view with the several walls of the frame structure removed and showing the pin and slot connection between the motor driven disk and the reciprocating plates that support the saw blade, Figure 5 is a cross-sectional view taken on lines V—V of Fig. 1, Figure 6 is an enlarged detail sectional view, and Figure 7 is a fragmentary detail sectional view showing the anti-friction connection between the rotatable disk and reciprocating saw carrying plate.

Referring more in detail to the accompanying drawing, there is illustrated a motor operated hand saw embodying a frame structure having a side wall 1 with a hand grip or handle 2 preferably formed integral therewith, the inner face of the wall 1 being provided with a depression tube that opens into a longitudinally extending rectangular pocket 3 that is closed by an opposite side wall 4 removably secured to the wall 1 as at 5, the forward end of the pocket 3 being open as shown in Figs. 3 and 4.

A stub shaft 6 is journaled in a side bearing 7 carried by the wall 1 and bracket 7ª within the frame and has a flexible drive shaft 8 attached to the outer end thereof, a pinion 9 being secured to the inner end of the stub shaft 6 within the depression 2. A disk 10 is journaled on the pin 11 anchored in the wall 1 and is disposed in the pocket 3, one side of the peripheral portion of the disk 10 being provided with geared teeth 12 that extend into the depression 2 in mesh with the pinion 9 as clearly shown in Fig. 3.

An elongated rectangular plate 13 having a saw blade 14 secured as at 15 to the outer end thereof is reciprocably mounted in the pocket 3, the opposite sides of the inner end of the plate 13 and the upper and lower edges thereof carrying anti-friction bearing balls 16 contacting the adjacent faces of the pocket 3 and removable wall 4 as shown in Fig. 6.

Operative connections are established between the disk 10 and adjacent inner ends of the saw carrying plate 13, the plate 13 at its inner end being provided with a transversely extending slot 17 supporting upon the opposed faces thereof, anti-friction bearing balls 18 that are engaged by a rectangular block 19 pivotally mounted upon the laterally extending pin 20 carried by one face of the disk 10 adjacent the peripheral edge thereof as shown in Figs. 4 and 7.

In the use of the saw, the operator grips the handle 2 and holds the frame structure rigidly supported against movement, the flexible shaft 8 rotating the pinion 9 and toothed portion 12 of the disk 10, causing rotation of the disk and reciprocating movement of the saw carrying plate 13 through the medium of the block and slot connection 19 and 17 between the disk and plate 13. During rotation of the disk 10, the block 19 moves upwardly and downwardly in the slot 17 over the anti-friction bearing balls 18 to cause the plate 13 to be moved back and forth in the pocket 3, or reciprocated therein to impart a similar movement to the saw blade 14.

While there is herein shown and described the preferred embodiment of the present invention, it is nevertheless to be understood that minor changes may be made therein without departing from the spirit and scope of the invention as claimed.

What is claimed as new is:—

1. A hand saw comprising a frame having a hollow side wall and provided with a hand grip at one end, the inner face of said side wall having a circular recess therein, a removable wall secured to said side wall and forming a cover plate therefor, whereby to form a pocket in said frame open at the front end thereof, a saw supporting member including a plate slidable in and out of said pocket and having a transverse slot extending across its inner end, a disk in said recess, a pin projecting from said disk and engaging in said slot, means to rotate said disk, bearing balls housed in the top and bottom edges of said plate and bearing on the top and bottom sides of said pocket, and other bearing balls housed in the faces of said plate and bearing against the cover plate and the opposed surface of the hollow side wall.

2. A hand saw comprising a frame having a hollow side wall and provided with a hand grip at one end, the inner face of said side wall having a circular recess therein, a removable wall secured to said side wall and forming a cover plate therefor, whereby to form a pocket in said frame open at the front end thereof, a saw supporting member including a plate slidable in and out of said pocket and having a transverse slot extending across its inner end, a disk in said recess, a pin projecting from said disk and engaging in said slot, means to rotate said plate and bearing balls on the top and bottom edges of said plate and bearing on the top and bottom sides of said pocket, other bearing balls housed in the faces of said plate and bearing against the cover plate and the opposed surface of the hollow side wall, bearing balls housed in the side edges of said slot, and a substantially rectangular head swivelled on said pin and engaging said last mentioned bearing balls.

In testimony whereof I affix my signature.

ALPHONSE T. RICARD.